United States Patent
Sergey et al.

(10) Patent No.: US 8,707,346 B2
(45) Date of Patent: Apr. 22, 2014

(54) METHOD AND APPARATUS FOR DIGITAL BROADCASTING SERVICE

(75) Inventors: Seleznev Sergey, Suwon-si (KR); Sung Oh Hwang, Yongin-si (KR); Byung Rae Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 280 days.

(21) Appl. No.: 12/650,034

(22) Filed: Dec. 30, 2009

(65) Prior Publication Data

US 2010/0169172 A1    Jul. 1, 2010

(30) Foreign Application Priority Data

Dec. 30, 2008  (KR) .................. 10-2008-0136586

(51) Int. Cl.
*H04N 7/16*    (2011.01)

(52) U.S. Cl.
USPC ............................. 725/28; 725/30; 709/225

(58) Field of Classification Search
USPC ............ 725/26–31, 93, 116; 709/217–231
See application file for complete search history.

(56) References Cited

U.S. PATENT DOCUMENTS

| | | | | |
|---|---|---|---|---|
| 4,945,563 A | * | 7/1990 | Horton et al. ............ | 380/203 |
| 5,619,247 A | * | 4/1997 | Russo ...................... | 725/104 |
| 5,987,518 A | * | 11/1999 | Gotwald .................. | 709/230 |
| 6,057,872 A | | 5/2000 | Candelore | |
| 7,072,472 B2 | * | 7/2006 | Kubota et al. ........... | 380/210 |
| 2001/0029511 A1 | * | 10/2001 | Burda et al. ............. | 707/202 |
| 2002/0144274 A1 | | 10/2002 | Gaviot et al. | |
| 2004/0133909 A1 | | 7/2004 | Ma | |
| 2004/0268420 A1 | | 12/2004 | Addington et al. | |
| 2005/0108763 A1 | | 5/2005 | Baran et al. | |
| 2006/0013555 A1 | | 1/2006 | Poslinski | |
| 2007/0098165 A1 | | 5/2007 | Yoshikawa | |
| 2007/0112580 A1 | | 5/2007 | Tang-Talpin et al. | |
| 2008/0022302 A1 | | 1/2008 | Tanaka et al. | |
| 2008/0235723 A1 | | 9/2008 | Park et al. | |
| 2010/0153992 A1 | | 6/2010 | Namvar | |

FOREIGN PATENT DOCUMENTS

| | | |
|---|---|---|
| CN | 1513262 | 7/2004 |
| CN | 101292528 | 10/2008 |
| CN | 101317453 | 12/2008 |
| EP | 1 235 431 | 8/2002 |
| JP | 2002-262269 | 9/2002 |
| JP | 2002-359800 | 12/2002 |
| JP | 2003-153203 | 5/2003 |
| JP | 2005-032234 | 2/2005 |
| JP | 2005-160032 | 6/2005 |
| JP | 2005-260836 | 9/2005 |
| JP | 2008-017372 | 1/2008 |
| WO | WO 2007/064075 | 6/2007 |

\* cited by examiner

*Primary Examiner* — Annan Shang
(74) *Attorney, Agent, or Firm* — The Farrell Law Firm, P.C.

(57) ABSTRACT

A method and apparatus for a digital broadcasting service may allow direct and real-time control of a digital broadcasting receiver. A service providing server inserts a content control access criteria descriptor into a transport stream and transmits content and the content control access criteria descriptor to the receiver through the transport stream. The receiver receives the transport stream and processes the content according to the content control access criteria descriptor, which can contain lock control information and coupon provision information. The lock control information indicates whether a control function of the receiver is locked or unlocked for specific content. The coupon provision information indicates whether a coupon available for the purchase of pay content is granted depending on execution of specific content.

12 Claims, 3 Drawing Sheets

METHOD AND APPARATUS FOR DIGITAL BROADCASTING SERVICE

PRIORITY

This application claims priority to an application entitled "METHOD AND APPARATUS FOR DIGITAL BROADCASTING SERVICE" filed in the Korean Intellectual Property Office on Dec. 30, 2008 and assigned Serial No. 10-2008-0136586, the contents of which are hereby incorporated by reference.

BACKGROUND OF THE INVENTION

1. Field of the Invention

The present invention relates in general to a digital broadcasting service technology and, more particularly, to a method and apparatus for a digital broadcasting service allowing direct and real-time control of a digital broadcasting receiver.

2. Description of the Related Art

Generally, a broadcasting service is provided to all users who have suitable receiving terminals. Such broadcasting services may be classified into an audio broadcasting service that offers audio only, a video-centered broadcasting service that offers video as well as audio, and a multimedia broadcasting service that offers audio, video and data all together. Although traditional broadcasting services have been based on analog systems, most broadcasting services today are digital, with dramatic advances in related technologies. In addition, surpassing the conventional broadcast systems centered on a transmission tower, modern broadcasting services are making a growth toward various systems employing wired networks, wireless networks, and artificial satellites, alone or in connection with each other. Particularly, with the advent of mobile communication technology, current broadcasting systems are gradually merged with mobile communication systems.

A Digital Video Broadcasting (DVB) system, one of the existing broadcast systems which provide digital broadcasting services, may employ a conditional access message to restrictively provide broadcasting services for particular content or to specific end users. Such a conditional access message may include an Entitlement Management Message (EMM) and an Entitlement Control Message (ECM).

The EMM manages a subscriber's access authority. On the other hand, the ECM selectively offers given content to a specially qualified subscriber. Namely, the ECM refers to a message that represents conditional access properties of individual content. Such an ECM contains a control word necessary for descrambling content at a receiver. Specifically, in order to restrict a broadcasting service for a normal subscriber, a service provider performs encryption of particular content through scrambling before sending the content to a subscriber's receiver. Then the receiver which receives a broadcasting service can obtain a control word for descrambling in the case of only purchasing the scrambled content.

However, such conditional access messages may fail to directly control the receiver, and also, may restrict a service by content only. Therefore, a method for controlling the digital broadcasting receiver is required so as to provide various and interactive services to end users.

SUMMARY OF THE INVENTION

An aspect of the present invention is to address at least the above-mentioned problems and/or disadvantages and to provide at least the advantages described below.

Accordingly, an aspect of the present invention is to provide a method and apparatus for a digital broadcasting service which allows for the control of a digital broadcasting receiver.

Another aspect of the present invention is to provide a method and apparatus for various and interactive digital broadcasting services through real-time control of a digital broadcasting receiver.

According to one aspect of the present invention, provided is a method for a digital broadcasting service of a service providing server, the method includes inserting a content control access criteria descriptor into a transport stream, wherein the content control access criteria descriptor is used to identify content control information for controlling an operation of a receiver depending on execution of content; and transmitting the content and the content control access criteria descriptor to the receiver through the transport stream.

According to another aspect of the present invention, provided is a method for a digital broadcasting service of a digital broadcasting receiver, the method includes receiving a transport stream which contains content and a content control access criteria descriptor which is used to identify content control information for controlling an operation of the receiver depending on execution of the content; and processing the content according to the content control access criteria descriptor.

According to still another aspect of the present invention, provided is an apparatus for a digital broadcasting service of a service providing server, the apparatus includes a first unit configured to insert a content control access criteria descriptor into a transport stream, wherein the content control access criteria descriptor is used to identify content control information for controlling an operation of a receiver depending on execution of content; and a second unit configured to transmit the content and the content control access criteria descriptor to the receiver through the transport stream.

According to yet another aspect of the present invention, provided is an apparatus for a digital broadcasting service of a digital broadcasting receiver, the apparatus includes a first unit configured to receive a transport stream which contains content and a content control access criteria descriptor which is used to identify content control information for controlling an operation of the receiver depending on execution of the content; and a second unit configured to process the content according to the content control access criteria descriptor.

Aspects of the present invention can provide a variety of digital broadcasting services to end users through a direct control of a digital broadcasting receiver by using a content control access criteria descriptor in an Entitlement Control Message (ECM). Furthermore, aspects of the present invention can provide interactive digital broadcasting services through a real-time control of a digital broadcasting receiver by using ECM repeatedly transmitted between content.

BRIEF DESCRIPTION OF THE DRAWINGS

Other aspects, advantages, and salient features of the invention will become more apparent to those skilled in the art from the following detailed description, taken in conjunction with the annexed drawings, in which.

DETAILED DESCRIPTION OF THE INVENTION

Non-limiting embodiments of the present invention will now be described more fully with reference to the accompanying drawings. The invention may be embodied in many different forms and should not be construed as limited to the embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent embodiments of the invention, the drawings are not necessarily to scale and certain features may be exaggerated or omitted in order to better illustrate and explain the present invention.

Figure 1:
FIG. 1 is a diagram illustrating a configuration of a digital broadcasting service system in accordance with an embodiment of the present invention.

At the outset, a system for providing a digital broadcasting service will be described. FIG. 1 is a diagram illustrating a configuration of a digital broadcasting service system in accordance with an embodiment of the present invention.

Referring to FIG. 1, the digital broadcasting service system includes a service provider server 100 (service server) which transmits digital broadcasting content, and a digital broadcasting receiver 200 (receiver) which receives digital broadcasting content from the service server 100.

The service server 100 provides a broadcasting service and performs related functions such as content acquisition, content transmission, accounting, etc. Such functions of the service server 100 may be individually performed by different entities.

The service server 100 acquires content from content providers and transmits such content to end users. In the case of particular content (i.e., pay content), the service server 100 performs encryption (e.g., scrambling) of the content so as to prevent unauthorized access. If a subscriber buys certain pay content, the service server 100 sends a Control Word (CW) for decryption (e.g., descrambling) of the content to the subscriber's receiver 200 through an Entitlement Control Message (ECM).

Additionally, the service server 100 transmits various content, content-related information (e.g., ECM, Program Specific Information/Service Information (PSI/SI), Electronic Service Guide (ESG), etc.), and subscriber-related information (e.g., an Entitlement Management Message (EMM), etc.) through a Transport Stream (TS). In particular, a control word is transmitted while linked with the ECM. A control word may be used when the service server 100 scrambles program components (i.e., video, audio, data, etc.) and when the receiver 200 descrambles a program. Here, particular content (e.g., pay broadcasting) is scrambled using a control word before transmission.

Furthermore, the service server 100 may provide a coupon available for the purchase of particular pay content. That is, the service server 100 may offer a coupon that entitles a subscriber to free access to particular content.

In particular, the service server 100 transmits information on content control access criteria, together with the content. The content control access criteria may refer to standards used for the control of the receiver 200. There are three functions in the content control access criteria. First, the content control access criteria may lock or unlock a control function of the receiver 200. Second, the content control access criteria may inform the receiver 200 of coupon provision. Third, the content control access criteria may enable the receiver 200 to selectively notify a subscriber of coupon provision.

The service server 100 transmits the content control access criteria, together with the content, through a TS. Here, the content control access criteria are inserted as descriptors into the ECM.

The receiver 200 provides a digital broadcasting service to end users while receiving and executing digital broadcasting.

On receipt of the aforesaid transport stream, the receiver 200 detects EMM in the received transport stream by using a Packet IDentifier (PID) assigned to a Conditional Access Table (CAT) in the transport stream. Also, the receiver 200 retrieves ECM from the received transport stream by using PID assigned to a Program Map Table (PMT) in the transport stream and EMM of a user of the receiver 200. Then the receiver 200 retrieves the content control access criteria from ECM and performs a specified function according to the content control access criteria.

In the case of pay content, the receiver 200 checks a subscriber's access qualification by comparing conditional access properties (e.g., parental rating, blackout, etc.) in the ECM, related to the content to be accessed, with information on access qualification stored in a smart card (e.g., Subscriber Identity Module (SIM) or Universal Subscriber Identity Module (USIM)). If a subscriber's access qualification is approved, the receiver 200 descrambles streams (i.e., video, audio, data, etc.) related to the content by using a control word. The descrambled streams are decoded and output.

As discussed above, pay content may be purchased by means of a coupon the service server 100 offers. Such a coupon may be provided when specific content (e.g. an advertisement) is executed by a subscriber of digital broadcasting.

Since wired/wireless interfaces, through which the service server 100 transmits content to the receiver 200 or the receiver 200 accesses the service server 100, are not essential to an understanding of the present invention, a related description will be omitted.

Figure 2:
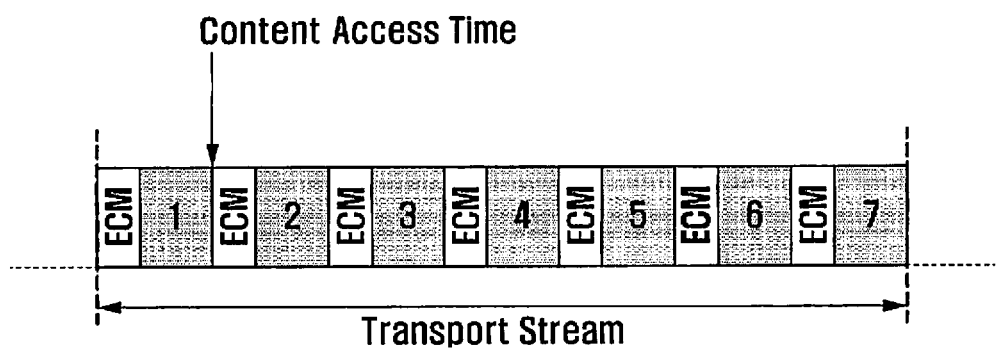
FIG. 2 is a diagram illustrating a transport stream in accordance with an embodiment of the present invention.

A transport stream will be explained in detail hereinafter. FIG. 2 is a diagram illustrating a transport stream in accordance with an embodiment of the present invention.

A broadcasting service according to embodiments of this invention is based on a streaming service. For a streaming service, the service server 100 employs a transport stream or a transport stream packet.

It will be presumed herein that a transport stream is a Moving Picture Experts Group (MPEG) transport stream packet, which contains a variety of data according to particular protocols such Multi Protocol Encapsulation (MPE), Internet Protocol (IP), User Datagram Protocol (UDP), Real-Time Protocol (RTP), and File Delivery over Unidirectional Transport/Access Control List (FLUTE/ALC). Such data may include EMM, ECM, and PSI/SI tables which include a Conditional Access Table (CAT) and Program Map Table (PMT).

As discussed above, when receiving a transport stream, the receiver 200 detects the EMM by using the PID assigned to the CAT and then retrieves the ECM by using the PID assigned to the PMT and the EMM of a user. The aforesaid content control access criteria descriptor is contained in the ECM.

FIG. 2 shows a transport stream through which content indicated by reference numbers 1 to 7 and the ECM are transmitted.

The content control access criteria descriptor is inserted into each individual the ECM and transmitted through a transport stream. The ECM contains descrambling information, a content control access criteria descriptor, and a control word (e.g., TEKs).

As illustrated, the service server 100 repeatedly transmits the ECM in a transport stream, so the receiver 200 can quickly access the ECM during reception.

A content control access criteria descriptor will be explained in detail hereinafter. Tables 1 and 2 are given below to illustrate a content control access criteria descriptor in accordance with an embodiment of the present invention.

TABLE 1

| Contents control_information access criteria descriptor | Tag | Length (in bits) | Type |
|---|---|---|---|
| Contents_control_information_byte | 0x011 | 8 | Bslbf |

TABLE 2

| Bit # | 7 | 6 | 5 | 4 | 3 | 2 | 1 | 0 |
|---|---|---|---|---|---|---|---|---|
| Assignment | RSV | RSV | RSV | RSV | RSV | RSV | CP | LC |

Table 1 shows an example of a content control access criteria descriptor, which has a length of eight bits. A content control access criteria descriptor is used to identify the content control information for controlling the operation of the receiver depending on the execution of the content.

Table 2 shows an example of a content control access criteria descriptor assigned to each individual bit. A content control access criteria descriptor includes Lock Control (LC) information and Coupon Provision (CP) information. As shown in Table 2, the LC information and the CP information are assigned to bit numbers 0 and 1, respectively.

The LC information and the CP information will be explained in detail.

Figure 3:
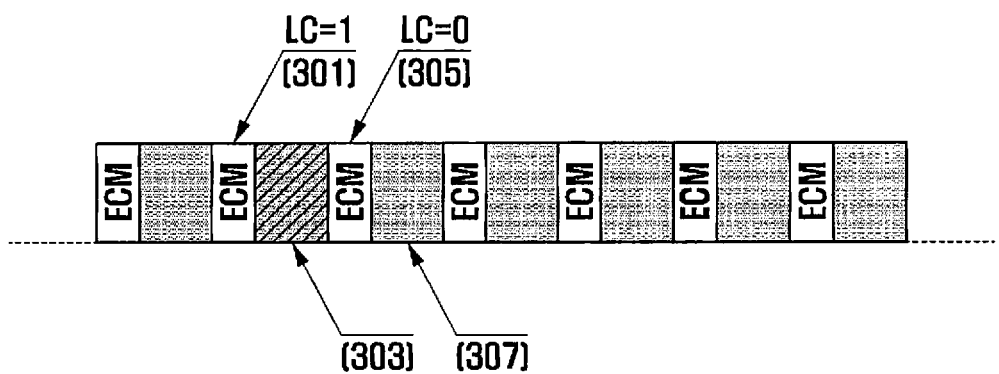
FIG. 3 is a diagram illustrating a Lock Control (LC) in accordance with an embodiment of the present invention.

FIG. 3 is a diagram illustrating the LC in accordance with an embodiment of the present invention.

FIG. 3 shows a transport stream through which the ECM is transmitted. As shown, the ECM is repeatedly transmitted at regular intervals between contents. Referring again to Tables 1 and 2, the service server 100 may set the LC bit of a content control access criteria descriptor to "0" or "1". Specifically, the LC bit "0" means unlocking of a control function, and the LC bit "1" means locking of a control function. For example, if the service server 100 sets the LC bit to "1", the receiver 200 fails to control specific contents and therefore should output them unconditionally.

On receipt of the ECM in a transport stream, the receiver 200 retrieves the LC bit from a content control access criteria descriptor in the ECM. Then the receiver 200 locks or unlocks a control function for content, depending on the retrieved LC bit. In the case of locking, a user of the receiver 200 cannot use a control function such as play, pause, fast forward, rewind, etc.

For example, if the LC bit is set to "1" as indicated by a reference number 301, a user cannot skip the subsequent content 303 by using a control function such as Fast Forward (FF) in the receiver 200 with a control function locked.

Alternatively, if a user skips the aforesaid content 303 by using a control function such as fast forward, the receiver 200 may be forced to return to the beginning point of the skipped content.

If the LC bit is set to "0" as indicated by a reference number 305, a user can control the subsequent content 307 by freely using a control function such as play, pause, fast forward, rewind, etc. in the receiver 200 with a control function unlocked.

Accordingly, by controlling the receiver 200 through the LC bit, the service server 100 may force a subscriber to watch specific content such as an advertisement. That is, when the service server 100 sets the LC bit to "1" and sends a certain advertisement, the receiver 200 cannot skip relevant parts and thus forces a user to watch the content.

Figure 4:
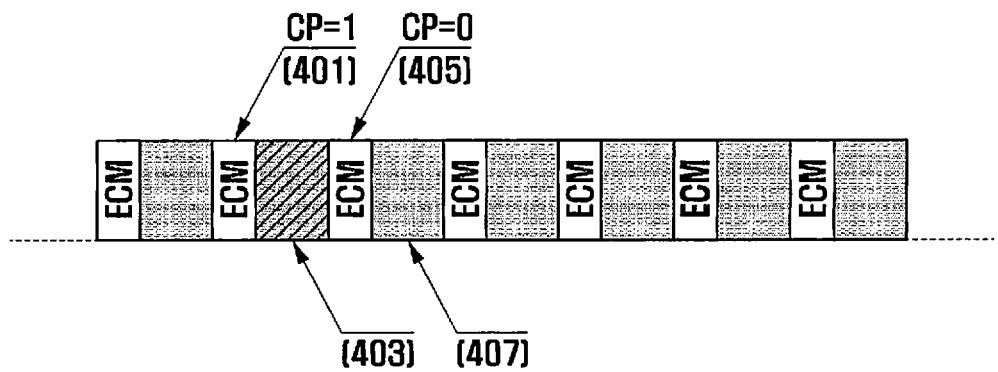
FIG. 4 is a diagram illustrating a Coupon Provision (CP) in accordance with an embodiment of the present invention.

FIG. 4 is a diagram illustrating the CP in accordance with an embodiment of the present invention.

FIG. 4 shows a transport stream through which the ECM is transmitted. As shown, the ECM is repeatedly transmitted at regular intervals between content. Referring again to Tables 1 and 2, the service server 100 may set the CP bit of a content control access criteria descriptor to "0" or "1". Specifically, the CP bit "0" means no grant of a coupon and the CP bit "1" means the grant of a coupon. That is, in case of providing a coupon for specific content, the service server 100 sets the CP bit to "1". In case of not providing any coupon, the service server 100 sets the CP bit to "0".

When receiving the ECM in content stream, the receiver 200 retrieves the CP bit from a content control access criteria descriptor in the ECM. Depending on the retrieved CP bit, the receiver 200 can determine whether a coupon is granted or not for specific content. Here, the grant of a coupon for specific content may be referred to as a metering service.

For example, if the CP bit is set to "1" as indicated by a reference number 401, the receiver 200 recognizes that a coupon is granted when the subsequent content 403 is executed.

If the CP bit is set to "0" as indicated by a reference number 405, the receiver 200 recognizes that there is no coupon granted for the subsequent content 407.

At this time, the receiver 200 may display a notification by which a user becomes aware of a coupon provision or not. Additionally, such a notification may depend on a combination of the LC bit and the CP bit.

Table 3 is given below to illustrate the operation of the receiver 200 in respective combinations of the LC and the CP bits in accordance with an embodiment of the present invention.

TABLE 3

| LC | CP | Principle of operation |
|---|---|---|
| 0 | 0 | Controls are not locked or unlocked. Coupons are not granted. Optionally display a notification to a user. |
| 1 | 0 | Controls are locked. Coupons are not granted. Do not show a notification to a user. |
| 0 | 1 | Controls are not locked or unlocked. Coupons can be granted. Display a notification to a user. |
| 1 | 1 | Controls are locked. Coupons can be granted. Optionally display a notification to a user. |

Referring to Table 3, the receiver 200 locks a control function thereof when the LC bit retrieved from the ECM is "1".

On the other hand, the receiver 200 does not lock or unlocks a control function thereof when the LC bit is "0".

Additionally, the receiver 200 recognizes that a coupon is granted when the CP bit retrieved from the ECM is "1". On the other hand, the receiver 200 recognizes that no coupon is granted when the CP bit is "0".

Particularly, as shown in Table 3, in two cases where the LC and CP bits are all "0" or all "1", the receiver 200 may optionally notify to a user whether a coupon is granted or not.

Additionally, in case where the LC and CP bits are respectively "1" and "0", the receiver 200 may not notify to a user whether a coupon is granted or not.

Also, incase where the LC and CP bits are respectively "0" and "1", the receiver 200 may always notify to a user whether a coupon is granted or not.

A combination of the LC and CP bits shown in Table 3 is, however, exemplary only and not to be considered as a limitation of the present invention. Any other combinations are contemplated.

Next, a content administrative method using the aforesaid LC and CP bits will be described.

Figure 5:
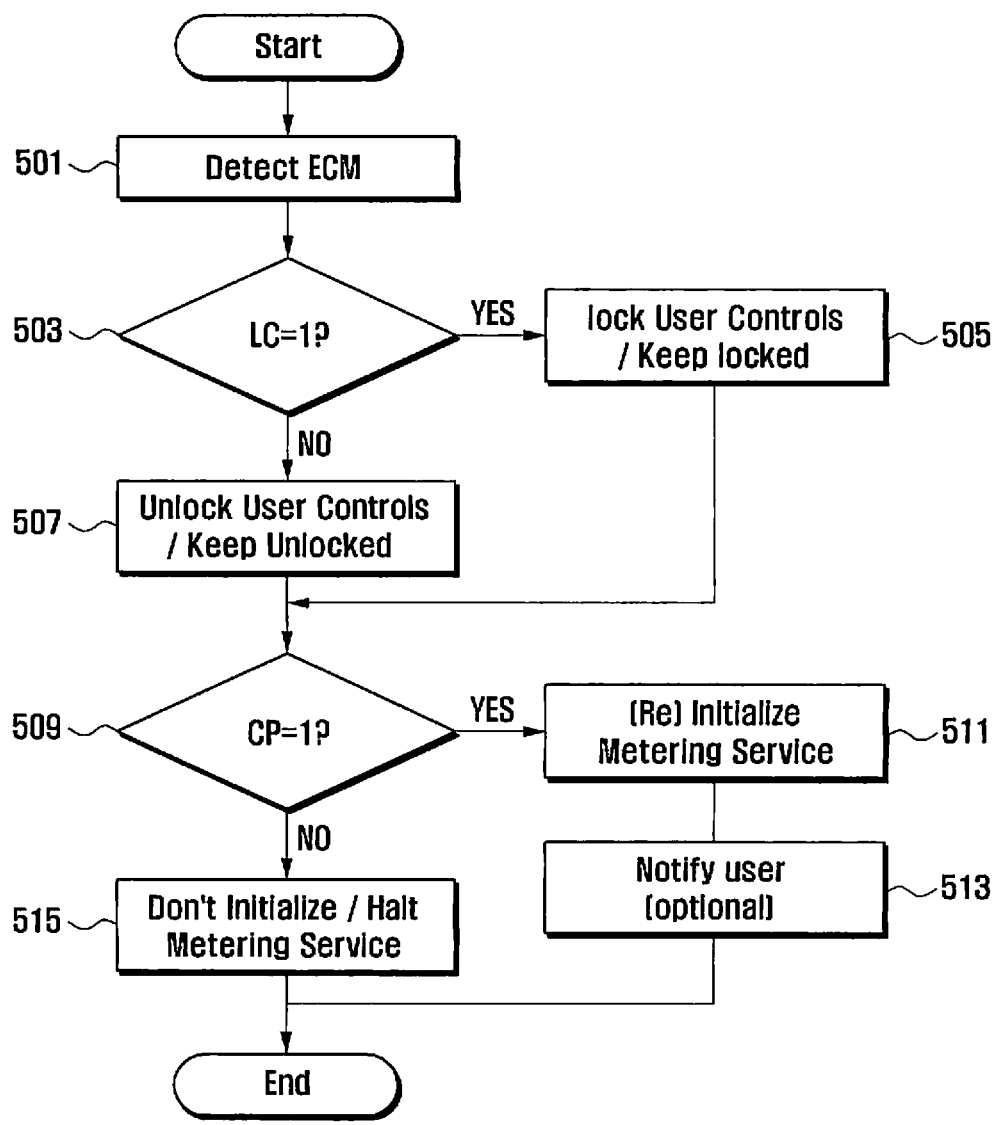
FIG. 5 is a flow diagram illustrating a content administrative method in accordance with an embodiment of the present invention.

FIG. 5 is a flow diagram illustrating a content administrative method in accordance with an embodiment of the present invention.

Referring to FIG. 5, the service server 100 may transmit the ECM having a content control access criteria descriptor and content through a transport stream. It is presumed herein that the content is an advertisement.

When receiving the transport stream, the receiver 200 detects and retrieves the ECM from the transport stream in step 501.

Then the receiver 200 determines whether the LC bit of a content control access criteria descriptor in the ECM is "1" in step 503.

If the LC bit is "1", the receiver 200 locks a control function in step 505. If a control function has been already locked, the receiver 200 maintains the locked state of a control function in this step 505.

If the LC bit is "0", the receiver 200 unlocks a control function in step 507. If a control function has been already unlocked, the receiver 200 maintains the unlocked state of a control function in step 507.

Next, the receiver 200 determines whether the CP bit of a content control access criteria descriptor in the ECM is "1" in step 509.

If the CP bit is "1", the receiver 200 initializes and performs a metering service in step 511. As mentioned above, the metering service means that a coupon is granted when content subsequent to the ECM having the CP bit "1" is executed. Preferably, such a coupon may be stored in the receiver 200.

Then the receiver 200 may notify to a user whether a coupon is granted or not in step 513. This notification step 513 is optional and may depend on a combination of the LC bit and the CP bit as discussed above.

On the other hand, if the CP bit is "0", the receiver 200 does not perform a metering service in step 515. If a metering service has been already performed, the receiver 200 halts a metering service in this step 515.

As discussed heretofore, in an embodiment of this invention, the service server may force a subscriber to watch specific content such as an advertisement by means of the LC bit. Additionally, if a coupon is granted in compensation for watching an advertisement, the service server may inform a subscriber that a coupon has been provided by controlling the receiver. Therefore, a service provider can realize advertising profits through the control of the receiver.

Particularly, a content control method according to the invention may allow for the controlling the receiver by using the ECM transmitted at a high repeating rate. It is therefore possible to offer a greater number of various services than a conventional control method by contents.

For example, in the case where certain content in a transport stream is divided into three parts, namely, the first half of a program, an advertisement, and the second half of a program, a service may allow a subscriber to watch the second half of a program only if he or she watches an advertisement. In this case, a coupon may be used only for purchasing the second half of a program.

Furthermore, a coupon may be granted to purchase various content. In this case, if a subscriber gains a coupon in compensation for watching specific content, this coupon may be used for purchasing another specific pay content. Like this case, a digital broadcasting service method according to the present invention may provide interactive services in various manners.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method for a digital broadcasting service of a service providing server, the method comprising the steps of:
   inserting a content control access criteria descriptor into a transport stream, the content control access criteria descriptor used to identify content control information for controlling at least one operation of a receiver depending on an execution of content; and
   transmitting the content and the content control access criteria descriptor to the receiver through the transport stream,
   wherein the content control access criteria descriptor includes at least one of lock control information and coupon provision information,
   wherein the lock control information indicates whether a playback control function of the receiver is locked or unlocked for a specific content, and
   wherein the coupon provision information indicates whether a coupon is granted.

2. The method of claim 1, wherein the content control access criteria descriptor includes the lock control information.

3. The method of claim 1, wherein the content control access criteria descriptor includes coupon provision information.

4. A method for a digital broadcasting service of a digital broadcasting receiver, the method comprising the steps of:
   receiving a transport stream which contains content and a content control access criteria descriptor which is used to identify content control information for controlling at least one operation of the receiver depending on an execution of the content; and
   processing the content according to the content control access criteria descriptor,
   wherein the content control access criteria descriptor includes at least one of lock control information and coupon provision information,
   wherein the lock control information indicates whether a playback control function of the receiver is locked or unlocked for a specific content, and
   wherein the coupon provision information indicates whether a coupon is granted.

5. The method of claim 4, wherein the content control access criteria descriptor includes the lock control information, and
wherein the processing of the content includes:
recognizing the lock control information in the content control access criteria descriptor; and
executing the specific content, based on the lock control information.

6. The method of claim 4, wherein the content control access criteria descriptor includes the coupon provision information, and
wherein the processing of the contents includes:
recognizing the coupon provision information in the content control access criteria descriptor;
executing the specific content; and
granting the coupon based on the coupon provision information.

7. An apparatus for a digital broadcasting service of a service providing server, the apparatus comprising:
a first unit configured to insert a content control access criteria descriptor into a transport stream, wherein the content control access criteria descriptor is used to identify content control information for controlling at least one operation of a receiver depending on an execution of the content; and
a second unit configured to transmit the content and the content control access criteria descriptor to the receiver through the transport stream,
wherein the content control access criteria descriptor includes at least one of lock control information and coupon provision information,
wherein the lock control information indicates whether a playback control function of the receiver is locked or unlocked for a specific content, and
wherein the coupon provision information indicates whether a coupon is granted.

8. The apparatus of claim 7, wherein the content control access criteria descriptor includes the lock control information.

9. The apparatus of claim 7, wherein the content control access criteria descriptor includes the coupon provision information.

10. An apparatus for a digital broadcasting service of a digital broadcasting receiver, the apparatus comprising:
a first unit configured to receive a transport stream which contains content and a content control access criteria descriptor which is used to identify content control information for controlling operation of the receiver depending on an execution the content; and
a second unit configured to process the contents according to the content control access criteria descriptor,
wherein the content control access criteria descriptor includes at least one of lock control information and coupon provision information,
wherein the lock control information indicates whether a playback control function of the receiver is locked or unlocked for a specific content, and
wherein the coupon provision information indicates whether a coupon is granted.

11. The apparatus of claim 10, wherein the content control access criteria descriptor includes the lock control information, and
wherein the second unit is further configured to recognize the lock control information in the content control access criteria descriptor, and to execute the specific content, based on the lock control information.

12. The apparatus of claim 10, wherein the content control access criteria descriptor includes the coupon provision information, and
wherein the second unit is further configured to recognize coupon provision information in the content control access criteria descriptor, execute the specific content, and grant the coupon based on the coupon provision information.

* * * * *